US006553819B1

(12) United States Patent

Schernewski et al.

(10) Patent No.: US 6,553,819 B1

(45) Date of Patent: Apr. 29, 2003

(54) DEVICE AND METHOD FOR DETERMINING THE START OF INJECTION IN A DIRECT-INJECTION INTERNAL COMBUSTION ENGINE

(75) Inventors: Ralf Schernewski, Karlsruhe (DE); Achim Przymusinski, Regensburg (DE); Thomas Brandmeier, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/218,848

(22) Filed: Dec. 22, 1998

(30) Foreign Application Priority Data

Dec. 22, 1997 (DE) ........................................ 197 57 293

(51) Int. Cl.[7] ............................................... G01M 15/00

(52) U.S. Cl. ...................................................... 73/119 A

(58) Field of Search ............................... 73/116, 119 A, 73/117.3; 123/446

(56) References Cited

U.S. PATENT DOCUMENTS 4,261,209 A * 4/1981 Hatsuno et al. ........... 73/119 A
4,299,124 A * 11/1981 Knapp et al. ................. 73/116
4,462,368 A * 7/1984 Funada ........................ 123/446
4,494,507 A * 1/1985 Yasahura .................. 73/119 A
4,785,771 A * 11/1988 Ibuki et al. ............... 73/119 A
4,989,150 A * 1/1991 Tazawa .................... 73/119 A
5,535,621 A * 7/1996 Glidewell et al. ........ 73/119 A

* cited by examiner

*Primary Examiner*—Eric S. McCall
*Assistant Examiner*—Maurice Stevens
(74) *Attorney, Agent, or Firm*—Laurence A. Greenberg; Werner H. Stemer; Ralph E. Locher

(57) ABSTRACT

A device for determining a start of injection in a direct-injection internal combustion engine has a magnetoelastic pressure sensor disposed in an injection line leading to an injection valve which detects pressure changes in the injection line owing to an injection process of the injection valve by utilizing the magnetoelastic effect. The device also has an evaluation device that determines a dead time between an initiation of the injection process and the start of injection with the aid of the measurement signal of this magnetoelastic pressure sensor.

19 Claims, 4 Drawing Sheets

DEVICE AND METHOD FOR DETERMINING THE START OF INJECTION IN A DIRECT-INJECTION INTERNAL COMBUSTION ENGINE

BACKGROUND OF THE INVENTION

Field of the Invention

The invention relates to a device for determining the start of injection in a direct-injection internal combustion engine. It is important in a direct-injection internal combustion engine to know the exact start of injection in order to be able to make an optimum setting of the injection profile and thus also of the combustion behavior.

This holds, in particular, for the injection systems known under the designation of common rail systems in diesel engines and under the designation of high-pressure direct-injection systems in spark-ignition engines. In such systems a high-pressure pump is used to convey fuel from a fuel reservoir into a high-pressure accumulator via which the fuel is then present at injection valves which are disposed in the combustion chambers of the internal combustion engine. The processes of injecting into the combustion chambers of the internal combustion engine are initiated by applying current to the injection valves, the start of injection into the combustion chambers depends on the response delay of the injection valves and on the pressure present at the injection valves.

Various methods are already known in the prior art for determining the exact start of injection into the combustion chambers of the internal combustion engine after current has been applied to the injection valves, and in order to be able thereby to make an optimum setting of the injection profile and/or combustion profile in the combustion chamber. Thus, it has been proposed to fix the exact start of injection in accordance with the respective operating conditions of the internal combustion engine with the aid of a characteristic diagram stored in the control unit of the internal combustion engine. However, in this case it is necessary in advance for the characteristic diagram data to be determined either by simulation calculation or by experiment, something that is very expensive since it has to be performed separately for each type of injection system. Even after the characteristic diagram data have been matched to the respective type of injection system, strong deviations still frequently occur between the start of injection as determined from the characteristic diagram data and the actual start of injection into the combustion chamber. It is also the case in the prior art that pickups, which directly scan the stroking of the nozzle needle in the injection valve in order to avoid these disadvantages of an evaluation based on characteristic diagram data, are already known. However, these pickups are relatively complicated and expensive, since they have to be installed directly into the injection valves.

SUMMARY OF THE INVENTION

It is accordingly an object of the invention to provide a device and method for determining the start of injection in a direct-injection internal combustion engine which overcome the above-mentioned disadvantages of the prior art devices and methods of this general type, which is distinguished by simple construction and high reliability and measuring accuracy.

With the foregoing and other objects in view there is provided, in accordance with the invention, in combination with a direct-injected internal combustion engine having an injection valve and an injection line connected to the injection valve, a device for determining a start of injection in the direct-injection internal combustion engine, including: a magnetoelastic pressure sensor disposed on the injection line connected to the injection valve, the magnetoelastic pressure sensor detecting a magnetoelastic effect caused by a pressure change in the injection line owing to an injection process of the injection valve and outputting a measurement signal for determining the start of injection.

The device according to the invention essentially has a pressure sensor which is disposed directly at the injection line to the injection valve and uses the magnetoelastic effect to detect the pressure change triggered by the injection process in the injection line. The measurement signal of the pressure sensor which indicates such a pressure change is temporally correlated in an evaluation unit for the purpose of initiating the injection process, in order to determine a dead time between the initiation of the injection process and the start of injection. The device according to the invention is distinguished by a simple and cost effective configuration which, in addition, can easily be integrated in any type of injection system. Furthermore, determining the start of injection requires only very simple detection and evaluation of the measured values.

It is advantageous, in particular, for the magnetoelastic pressure sensor to be constructed as a coil which is made from a ferromagnetic material and is wound around the injection line. The pressure sensor construction is particularly simple, robust and cost effective.

In accordance with an added feature of the invention, there is an evaluation device receiving and temporally correlating the measurement signal of the magnetoelastic pressure sensor with a drive signal output to the injection valve for initiating the injection process to determine a dead time between an initiation of the injection process and the start of injection.

In accordance with an additional feature of the invention, the magnetoelastic pressure sensor is formed of a ferromagnetic material.

In accordance with another feature of the invention, the magnetoelastic pressure sensor is formed of a nickel-iron alloy with a nickel component of 80%.

In accordance with a further added feature of the invention, the magnetoelastic pressure sensor has a coil wound around the injection line to detect a voltage induced by the pressure change in the injection line.

In accordance with a further additional feature of the invention, the magnetoelastic pressure sensor has a transformer with two coils detecting a voltage induced by the pressure change in the injection line.

In accordance with yet another feature of the invention, the evaluation device corrects an interference component generated by the drive signal of the injection valve in the measurement signal of the magnetoelastic pressure sensor resulting in a corrected measurement signal.

In accordance with another added feature of the invention, the evaluation device determines the measurement signal of the magnetoelastic pressure sensor by deriving a difference between an initial measurement signal and a signal picked up by the magnetoelastic pressure sensor in a time period between the drive signal of the injection valve and an instant of the start of injection that is yielded by a response delay of the injection valve.

In accordance with another additional feature of the invention, the evaluation unit compares an absolute value of the corrected measurement signal with a threshold value to determine the start of injection of the injection valve in an event of overshooting of the threshold value.

In accordance with a concomitant feature of the invention, the evaluation device indicates the start of injection of the injection valve only if an absolute value of a predetermined sequential number of sample points of the measurement signal overshoot the threshold value.

Other features which are considered as characteristic for the invention are set forth in the appended claims.

Although the invention is illustrated and described herein as embodied in a device and method for determining the start of injection in a direct-injection internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
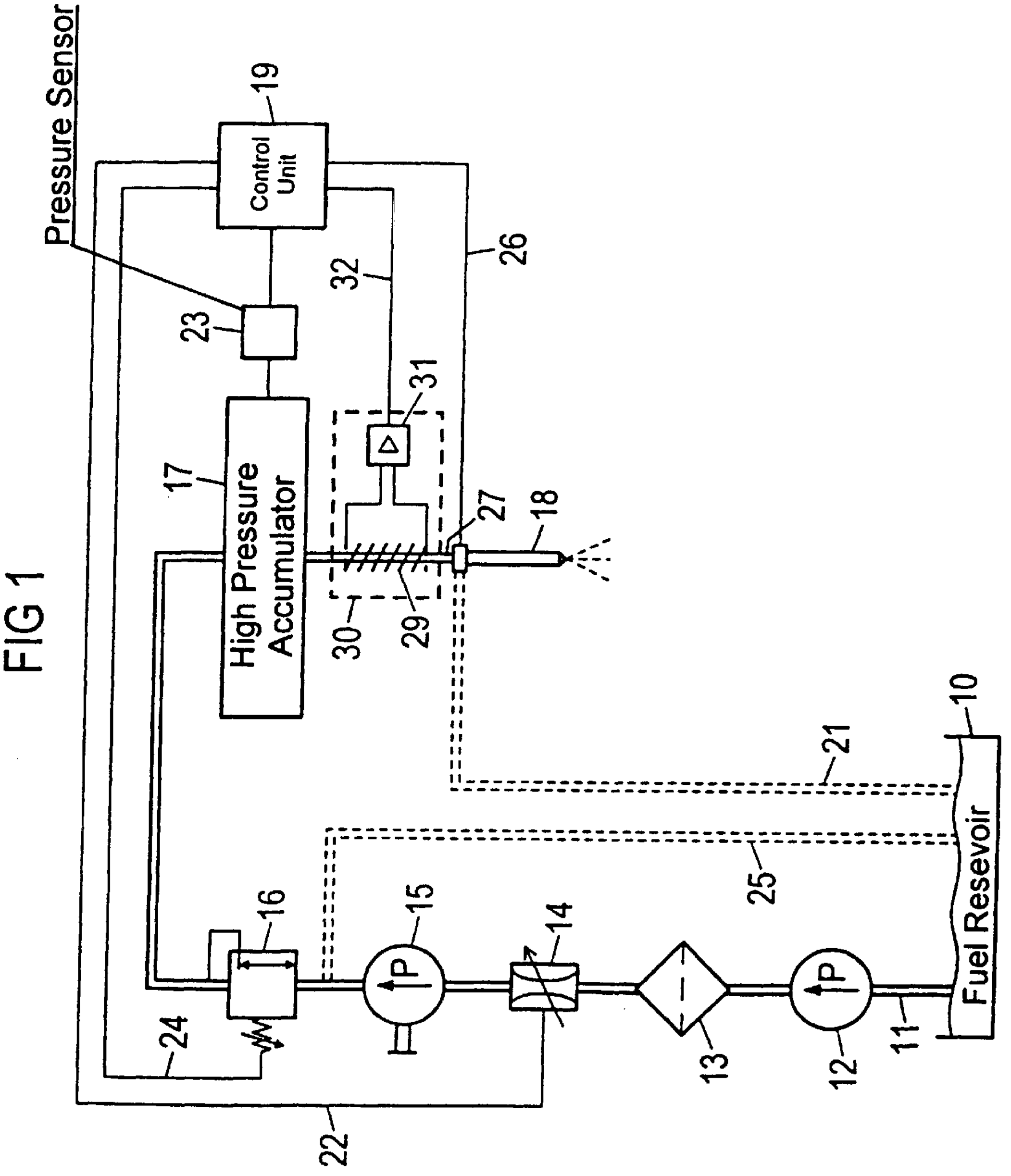
FIG. 1 is a diagrammatic block diagram of an injection system for an internal combustion engine having a device according to the invention.

In all the figures of the drawing, sub-features and integral parts that correspond to one another bear the same reference symbol in each case. Referring now to the figures of the drawing in detail and first, particularly, to FIG. 1 thereof, there is shown a fuel injection system for a direct-injection internal combustion engine, as it is used under the designation of a common rail system, above all in diesel engines. In the case of this injection system, fuel is sucked in from a fuel reservoir 10 via a fuel line 11 by a presupply pump 12. The presupply pump 12 supplies the fuel via a fuel filter 13 to a high-pressure pump 15 which compresses the fuel and feeds it under high pressure into a high-pressure accumulator 17.

In order to be able to set a volumetric flow of the high-pressure pump 15 into the high-pressure accumulator 17 as required in accordance with the respective operating conditions of the internal combustion engine, there is disposed in the fuel line 11 between the presupply pump 12 and the high-pressure pump 15 an additional suction throttling valve 14 with the aid of which a supply current to the high-pressure pump 15 can be regulated. The suction throttling valve 14 is addressed by a control unit 19 via a control line 22.

In order to be able to set the pressure in the high-pressure accumulator 17 in accordance with the desired operating conditions of the internal combustion engine, a pressure regulating valve 16 is further connected into the fuel line 11 downstream of the high-pressure pump 15. Via a fuel line 25, the pressure regulating valve 16 directs superfluous fuel which is not required to maintain a desired pressure in the high-pressure accumulator 17 away into the fuel reservoir 10, the retaining pressure of the pressure regulating valve 16 being set by the control unit 19 via a control line 24. Furthermore, a pressure sensor 23 is provided for regulating the pressure in the high-pressure accumulator 17. The pressure sensor 23 serves to detect the pressure prevailing instantaneously in the high-pressure accumulator 17, on the basis of which the control unit 19 undertakes to regulate the pressure via the pressure regulating valve 16 in accordance with the desired operating conditions of the internal combustion engine.

Fuel pressures of 0 to 150 MPa can be produced in the high-pressure accumulator 17 with the aid of the pressure regulating devices represented. The fuel pressures are available via fuel injection lines 27 at injection valves 18 (only one being shown), which are disposed in the combustion chambers of the internal combustion engine (not shown). The injection valves 18 generally have an injection nozzle that is closed by a needle subjected to a spring force. The needle can be raised against the spring force by a needle stroke generator, which is actuated piezoelectrically, for example, in order in this way to open the injection valve and thus permit the fuel present at the injection valve to be injected into the combustion chamber of the internal combustion engine. The injection process is initiated by the control unit 19, which is connected to the injection valves via control lines 26. The leakage fuel further occurring in the injection valves 18 is led back into the fuel reservoir 10 via fuel lines 21.

In order to be able to set the injection profile, and thus the combustion profile, in the combustion chamber of the internal combustion engine in an optimum fashion, it is important to know the exact start of injection of the fuel into the combustion chamber. The start of injection depends, on the one hand, on the response delay of the needle stroke generator in the injection valve or of the needle in the injection nozzle. Furthermore, the delay time between the driving of the injection valve and the start of injection rises with increasing fuel pressure in the high-pressure accumulator 17 and the fuel injection line 27. The needle stroke generator must then open the needle in the injection nozzle against a higher pressure, and this lengthens the injection process and thus the dead time between driving and the start of injection.

In order to be able to determine exactly the dead time between the triggering of the injection valve 18 and the start of injection, and thus to permit optimization of the engine management, in accordance with the invention a pickup 30 is disposed in the fuel injection line 27 upstream of the injection valve 18. As FIG. 1 shows, the pickup 30 has a coil 29 that is wound around the injection line 27 and preferably has approximately 1000 turns. The coil 29 consists of a material that exhibits a magnetoelastic effect. Such materials are principally ferromagnets in which a mechanical stress, for example a pressure change, influences the permeability, there being an approximately linear relationship between the change in the permeability and the mechanical stress. Nickel-iron alloys are particularly suitable in this case, the nickel component preferably being 80%. Permeability changes of approximately 40% are achieved with such nickel-iron alloys in conjunction with mechanical stresses of 100 $N/mm^2$. This change in permeability occurring in the case of ferromagnetic materials can be measured, for example, with the aid of a transformer-type configuration in which the mutual inductance of the two windings is influenced. However, it is also possible to detect the induced voltage by only one coil on the basis of the natural premagnetization of the ferromagnetic materials, as is carried out in the case of the pickup 30 in FIG. 1. The use of only one coil permits a simple, robust and also cost effective pickup 30, which also can easily be adapted to the respective spatial conditions in the direct-injection internal combustion engine.

The voltage induced in the coil 29 of the pickup 30 can be expressed by the following equation:

$$u_{ind} = \frac{3/8\lambda_p J^2 H}{(2\kappa_u + 3/8\lambda_p p)^2} nAp \tag{1}$$

where $\lambda_p$ and $\kappa_u$ are constants which depend on the material used in the coil and reproduce the relative change in length between a completely non-magnetized or saturated state, and the anisotropy constant. J corresponds to the magnetic polarization of the material used, and n and A stand for the number of turns and the cross-sectional surface of the coil, respectively. H reproduces the magnetic field strength of the premagnetization that is produced by the natural premagnetization of the material used for the coil. However, as an alternative it is also possible to configure the pressure sensor in a way similar to a transformer with two windings, the second winding ensuring the premagnetization. Such a configuration would increase the sensitivity of the pickup 30. Equation (1) further shows that the voltage $u_{ind}$ induced in the coil is a linear function of the temporal change in the pressure on the assumption of a stationary pressure operating point, that is to say p~const.

When the control unit 19 addresses the injection valve 18 via a drive line 26 for initiating an injection process, the needle stroke generator opens the injection nozzle by raising the needle against the spring bias, and the fuel present via the injection line 27 is injected into the combustion chamber of the internal combustion engine. The start of injection of the fuel into the combustion chamber leads, however, to a pressure drop in the injection line 27. In accordance with equation (1), the pressure drop induces a voltage in the coil 29 of the pickup 30. The induced voltage is amplified via an amplifier 31 integrated in the pickup 30, and applied on a measuring line 32 as a signal to the control unit 19. The control unit 19 correlates the measurement signal of the pickup 30 with the,drive signal for the injection valve 18, and can then determine the dead time between the start of driving and start of injection therefrom. However, instead of undertaking the evaluation in the control unit 19 of the internal combustion engine, it is also possible as an alternative to provide an independent evaluation unit which detects the measurement signal of the pickup 30 and the drive signal for the injection valve 18, and calculates the dead time therefrom.

Figures 2A, 2B, 2C, 2D:
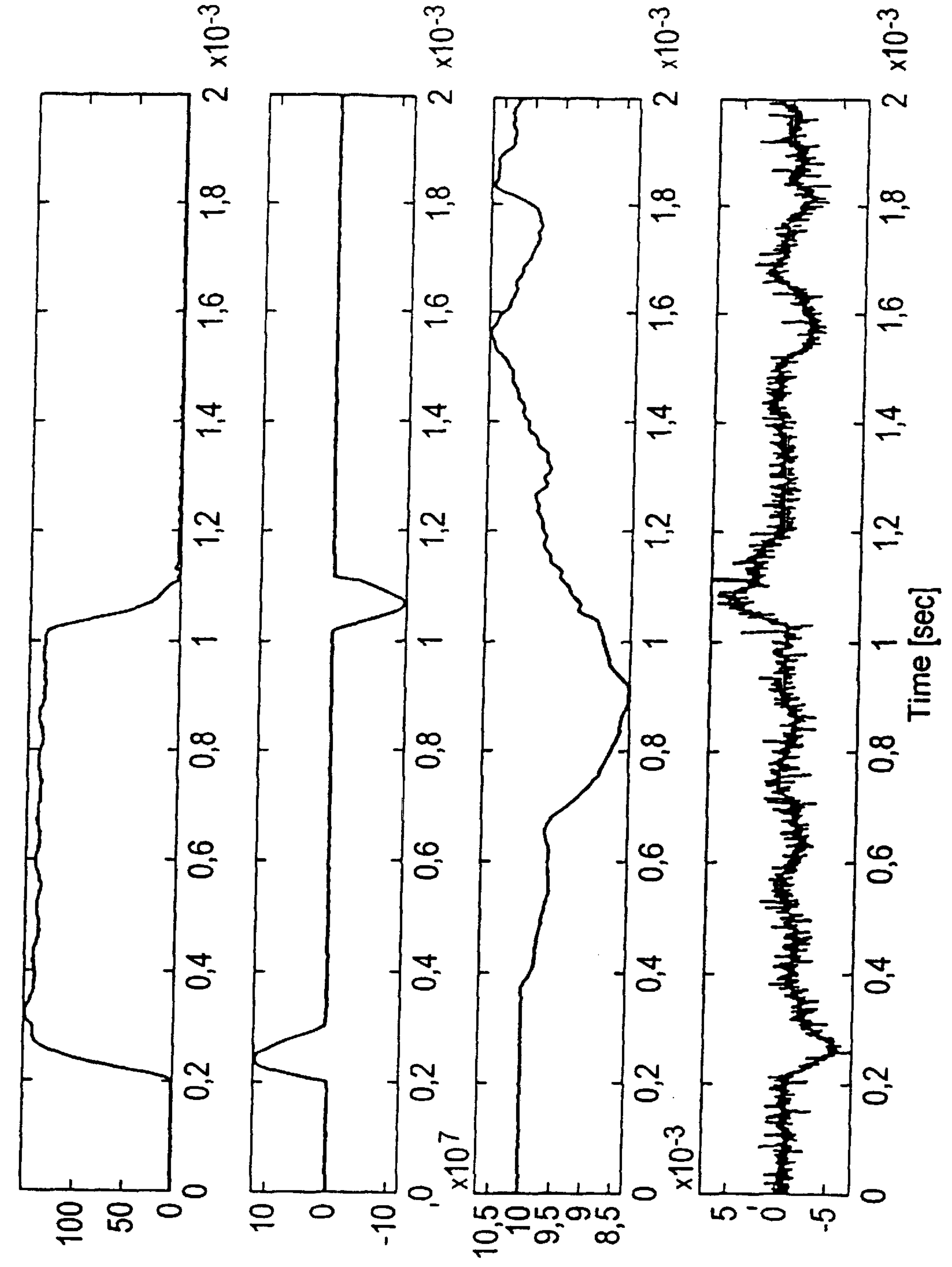
FIGS. 2a–2d are graphs of signal profiles during an injection process.

FIGS. 2_a_–2_d_ show the signal profile of an injection process with a piezoelectrically controlled injection valve. FIG. 2_a_ represents the drive voltage u(t), and FIG. 2_b_ represents the drive current i(t) of the piezoelectric injection valve. FIG. 2_d_ reproduces the voltage $u_i(t)$ induced in the coil 29. Furthermore, FIG. 2_c_ shows the signal profile of a reference pressure sensor that has additionally been disposed in an experimental setup on the injection line 27 near the pickup 30. This reference pressure sensor has been attached at the end of a spur line approximately 5 mm long, which has been branched off from the injection line 27 at a distance of approximately 2 cm upstream of the coil 29. The signal profiles shown in FIGS. 2_a_–2_d_ were sampled using a frequency of 2.5 MHz. The pressure in the high-pressure accumulator 17 was 100 MPa during the measurement process.

FIGS. 2_a_ and 2_b_ show the build up of the charge in the piezoelectric crystal of the injection valve at the start of driving by the control unit 19 at the positive current peak, and the degradation of the charge at the end of the drive by the negative current peak. The reference pressure sensor shows in FIG. 2_c_ the start of the pressure drop in the injection line 27 and thus the start of the injection into the combustion chamber via the injection valve approximately 150 μsec after the start of the drive shown in FIGS. 2_a_ and 2_b_. Finally, in FIG. 2_c_ the pressure drop in the signal of the reference pressure sensor is followed by decaying pressure fluctuations which are caused by the opening of the needle in the injection nozzle of the injection valve after the injection process on the injection line.

In addition to the induced voltage caused by the pressure change in the injection line 27, the measurement signal, shown in FIG. 2_d_, of the voltage induced in the coil 29 has an interference component which is produced by parasitics of the drive current for the injection valve. The voltage $u_i(t)$ induced in the coil 29 of the pickup 30 can therefore be represented by the following equation:

$$u_i(t)=u_{i1}(t)+u_{i2}(t) \tag{2}$$

where $u_{i1}(t)$ reproduces the pressure change in the injection line, and $u_{i2}(t)$ the interference component of the drive signal.

In order to be able to carry out a reliable determination of the start of injection with the aid of the pickup 30, it is therefore advantageous to separate the interference component from the signal shown in FIG. 2_d_. Such a compensation of interference can be carried out as follows in accordance with a preferred embodiment of the invention: assuming that the parasitic of the drive current for the injection valve can be represented as an interference system S with a transfer function of $G_{St}(s)$, the interference component $u_{i2}(t)$ can be represented as a convolution of an impulse response $g_{St}(t)$ of the interference system S with a drive current i(t) in accordance with the equation $$u_{i2}(t)=g_{St}(t)*i(t) \tag{3}$$

In a known transfer function $G_{St}(s)$, the result for the voltage caused by the pressure change in the injection line is thus $$u_{i1}(t)=u_i(t)-g_{St}(t)*i(t) \quad (4).$$

Since the transfer function $G_{St}(s)$ is in general not known, the interference system S must be estimated. The following approach is suggested in this case: the transfer function can be determined by an identification algorithm for a time range in which the measured induced voltage $u_i(t)$ in the coil 29 is determined only by the interference component $u_{i2}(t)$ of the drive current, that is to say there are no pressure changes in the injection line 26 which cause voltage to be induced in the coil 29. This is the case during the minimum dead time $t_{T,min}$ of the piezoelectric injection valve which arises as a result of the valve-specific response delay between starting to drive the valve at t0 and the opening of the injection valve. The following equation holds for this:

$$t_{1,min}=t_0+t_{T,min} \tag{5}$$

Figure 3A:
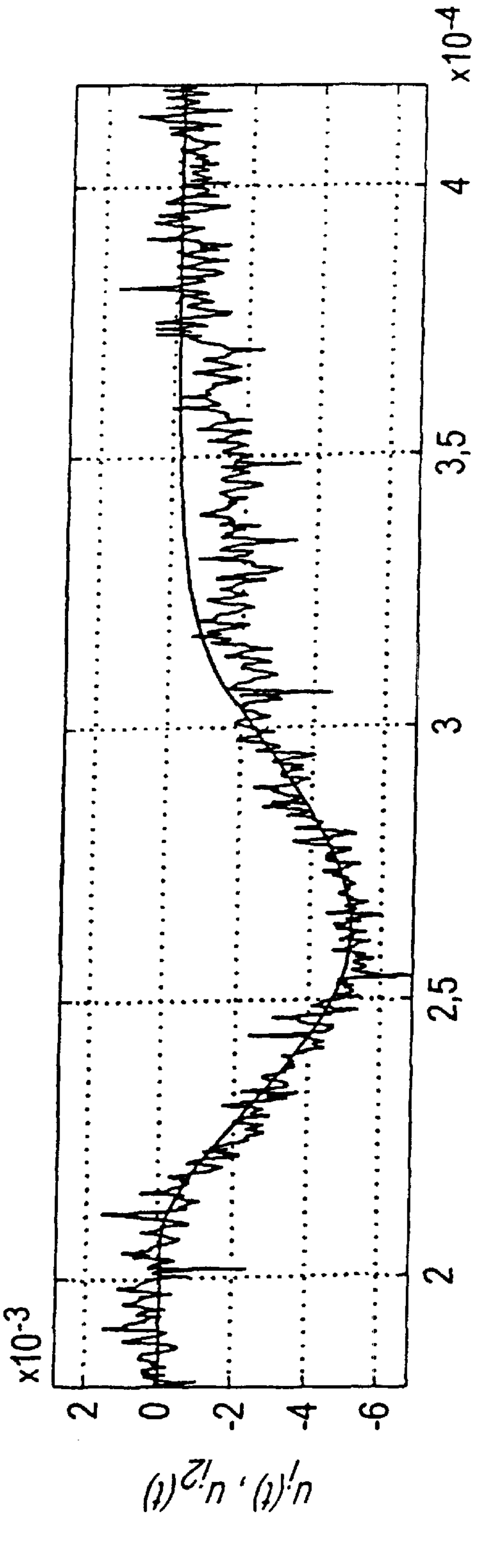
FIGS. 3a–3b are graphs of interference signal compensations.
Figure 3B:
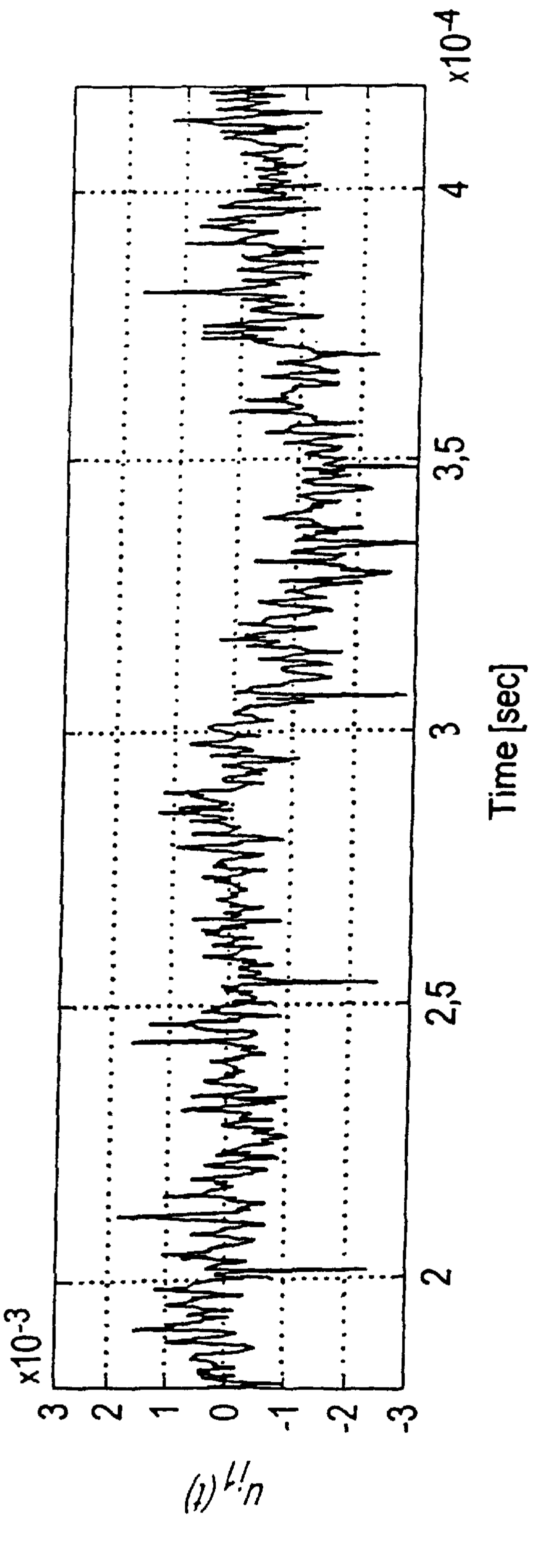

During the valve-specific minimum dead time, the interference system S can be identified and the time-discrete transfer function can be modulated with the aid of an autorecursive formulation and be identified from the drive current i(t) of the injection valve and the induced voltage $u_i(t)$ in the coil 29 in the time range $[t_0, t_{1,min}]$. FIGS. 3*a* and 3*b* show the result of this processing method, FIG. 3*a* reproducing the induced voltage $u_i(t)$ as a noisy signal, and the reconstructed interference component $u_{i2}(t)$ as a smooth curve. FIG. 3*b* shows the difference between the two signals and thus represents the voltage $u_{i1}(t)$ induced owing to the pressure change in the coil 29, that is to say the actual useful information.

The interference signal compensation is preferably performed directly in the control unit 19. The control unit 19 then determines the start of injection t1 into the combustion chamber from the interference-signal-compensated voltage signal. As FIG. 3*b* shows, the start of injection, which coincides with a pressure drop in the injection line 27, causes a negative voltage in the interference-signal-compensated voltage profile of the coil 29. In order to determine the start of injection, the control unit 19 compares the voltage profile, as compensated for interference signal, with a lower threshold value $u_{i,s}$ and displays the start of injection as soon as the voltage undershoots the threshold value.

Since, as represented in FIGS. 3*a*–3*b*, the voltage profile as compensated for interference signal is also overlaid by noise, there is the risk that the threshold value will already be undershot before the actual start of injection. In order to prevent the start of injection from being erroneously indicated in this case, the control unit 19 evaluates an undershooting of the threshold value at a specific sampling instant only when the threshold value is also undershot at a specific number of sampling instants following thereupon. It is also possible, as an alternative, to provide a low-pass filter in the pickup 30 or in the control unit 19, by which transient radio-frequency noise components can be filtered out of the signal.

Figure 4:
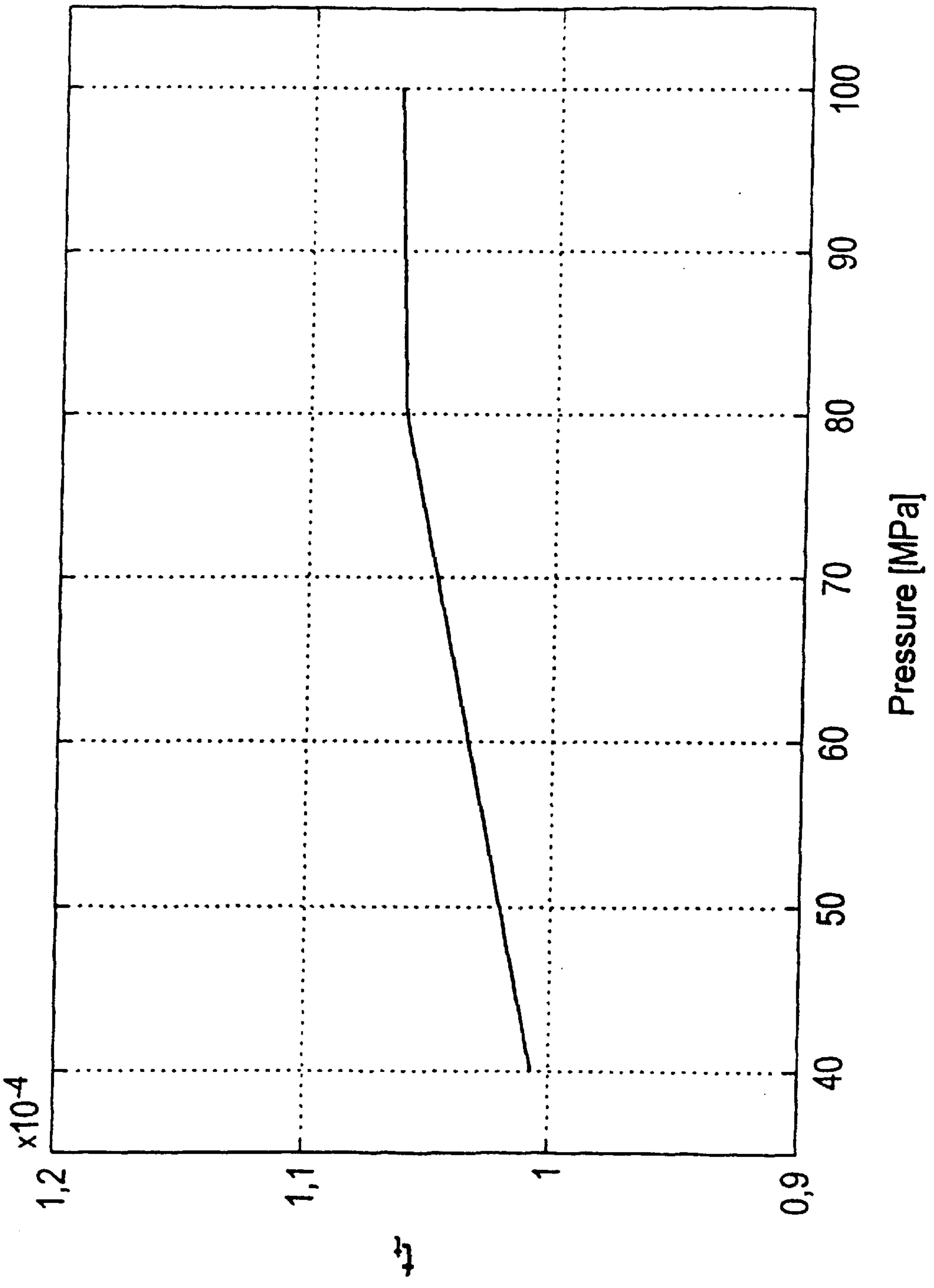
FIG. 4 is a graph of dead times determined between a start of driving and a start of injection in an internal combustion engine.

After establishing the start of injection t1, the control unit 19 determines the exact dead time of the injection valve by temporal correlation with the start of driving t0 of the injection valve. FIG. 4 represents the dead time $t_T$ for various fuel pressures in the high-pressure accumulator 17. It is to be seen in this case that the dead time rises in the case of higher pressures, since the needle in the piezoelectric injection valve must be opened against higher pressures.

In accordance with the invention, it is therefore possible for the exact instant of injection into the combustion chamber of the internal combustion engine to be determined in a simple and reliable way by detecting a magnetoelastic effect which is caused-by a pressure change in the injection line owing to an injection process of the injection valve. The magnetoelastic pressure sensor in this case preferably includes a coil wound around the injection line, and thereby permits a simple, robust and cost effective measurement setup.

We claim:

1. In combination with a direct-injected internal combustion engine having an injection valve and an injection line connected to the injection valve, a device for determining a start of injection of a fuel in the direct-injection internal combustion engine, comprising:

a pickup disposed on the injection line connected to the injection valve, said pickup detecting a magnetoelastic effect in the fuel caused by a pressure change in the injection line due to an injection process of the injection valve and outputting a measurement signal for determining the start of injection.

2. The device according to claim 1, including an evaluation device receiving and temporally correlating said measurement signal of said pickup with a drive signal output to the injection valve for initiating the injection process to determine a dead time between an initiation of the injection process and the start of injection.

3. The device according to claim 2, wherein said evaluation device corrects an interference component generated by the drive signal of the injection valve in the measurement signal of said pickup resulting in a corrected measurement signal.

4. The device according to claim 3, wherein said evaluation device determines the measurement signal of said pickup by deriving a difference between an initial measurement signal and a signal picked up by said pickup in a time period between the drive signal of the injection valve and an instant of the start of injection that is yielded by a response delay of the injection valve.

5. The device according to claim 3, wherein said evaluation unit compares an absolute value of said corrected measurement signal with a threshold value to determine the start of injection of the injection valve in an event of overshooting of the threshold value.

6. The device according to claim 5, wherein said evaluation device indicates the start of injection of the injection valve only if an absolute value of a predetermined sequential number of sample points of the measurement signal overshoot the threshold value.

7. The device according to claim 1, wherein said pickup is formed of a ferromagnetic material.

8. The device according to claim 1, wherein said pickup is formed of a nickel-iron alloy with a nickel component of 80%.

9. The device according to claim 1, wherein said pickup has a coil wound around the injection line to detect a voltage induced by the pressure change in the injection line.

10. A method for determining a start of injection of a fuel in a direct-injection internal combustion engine, which comprises:

a providing a pickup having a coil;

placing the coil on an injection line connected to an injection valve;

detecting with the coil a magnetoelastic effect in the fuel caused by a pressure change in the injection line due to an injection process of the injection valve; and outputting a measurement signal for determining a start of injection when a change in voltage in the coil has been detected.

11. The method according to claim 10, which comprises:

transmitting a drive signal from a control unit to the injection valve, the drive signal initiating the injection process:

timing the drive signal; and temporally correlating the measurement signal of the pickup with the drive signal to determine a dead time between an initiation of the injection process and the start of injection with an evaluation device receiving the measurement signal.

12. The method according to claim 10, which comprises forming the pickup from a ferromagnetic material.

13. The method according to claim 10, which comprises forming the pickup from a nickel-iron alloy with a nickel component of 80%.

14. The method according to claim 11, which comprises correcting with the evaluating device an interference component generated by the drive signal of the injection valve in the measurement signal of the pickup resulting in a corrected measurement signal.

15. The method according to claim 14, which comprises determining with the evaluating device the measurement signal of the pickup by deriving a difference between an initial measurement signal and a signal picked up by the pickup in a time period between the drive signal of the injection valve and an instant of the start of injection that is yielded by a response delay of the injection valve.

16. The method according to claim 14, which comprises comparing in the evaluating device an absolute value of the corrected measurement signal with a threshold value to determine the start of injection of the injection valve in an event of overshooting of the threshold value.

17. The method according to claim 16, which comprises indicating with the evaluating device the start of injection of the injection valve only if an absolute value of a predetermined, sequential number of sample points of the measurement signal overshoot the threshold value.

18. The method according to claim 10, which comprises not placing a second coil around the injection line;

measuring a premagnetization of a second coil;

forming a transformer from said first coil and said second coil;

detecting a change in voltage in the first coil by comparing the voltage in the second coil.

19. In combination with a direct-injected internal combustion engine having an injection valve and an injection line connected to the injection valve, a device for determining a start of injection of a fuel in the direct-injection internal combustion engine, comprising:

a pickup disposed on the injection line connected to the injection valve, said pickup detecting a magnetoelastic effect in the fuel caused by a pressure change in the injection line due to an injection process of the injection valve and outputting a measurement signal for determining the start of injection, said pickup having a transformer with two coils detecting a voltage induced by the pressure change in the injection line, a first of said coils wound around said injection line to detect a voltage induced by a pressure change in the injection line, a second of said coils not wound around said injection line, said second coil determining a premagnetization of said coils.

* * * * *